(12) United States Patent
Cai et al.

(10) Patent No.: US 10,069,320 B2
(45) Date of Patent: Sep. 4, 2018

(54) ELECTRONIC CIGARETTE WITH MINIATURIZED CHARGING AND DISCHARGING INTEGRATED CIRCUIT THEREFOR

(71) Applicant: Silergy Semiconductor Technology (Hangzhou) Ltd., Hangzhou (CN)

(72) Inventors: Yongbin Cai, Hangzhou (CN); Chen Zhao, Hangzhou (CN)

(73) Assignee: SILERGY SEMICONDUCTOR TECHNOLOGY (HANGZHOU) LTD., Hangzhou (CN)

( * ) Notice: Subject to any disclaimer, the term of this patent is extended or adjusted under 35 U.S.C. 154(b) by 564 days.

(21) Appl. No.: 14/734,172

(22) Filed: Jun. 9, 2015

(65) Prior Publication Data

US 2015/0357839 A1    Dec. 10, 2015

(30) Foreign Application Priority Data

Jun. 9, 2014   (CN) .......................... 2014 1 0252012

(51) Int. Cl.
*H02J 7/00* (2006.01)
*A24F 47/00* (2006.01)
(Continued)

(52) U.S. Cl.
CPC ............ *H02J 7/007* (2013.01); *A24F 47/008* (2013.01); *H02J 7/008* (2013.01); *H02J 7/0052* (2013.01);
(Continued)

(58) Field of Classification Search
CPC .... Y02E 60/12; H01M 2/1022; A24F 47/008; H02J 7/008; H02J 7/0052;
(Continued)

(56) References Cited

U.S. PATENT DOCUMENTS

| 2008/0074095 A1* | 3/2008 | Telefus ................... H02M 1/10 |
| | | 323/282 |
| 2010/0231172 A1* | 9/2010 | Bastami ................ H02J 7/0052 |
| | | 320/137 |

(Continued)

FOREIGN PATENT DOCUMENTS

CN    102832792 B    7/2014

*Primary Examiner* — Yalkew Fantu
*Assistant Examiner* — Mohammed J Sharief
(74) *Attorney, Agent, or Firm* — Westman, Champlin & Koehler, P.A.

(57) ABSTRACT

The present disclosure relates to an electronic cigarette and an integrated circuit therefor. The integrated circuit incorporates a bi-directional control scheme for a charging process of a rechargeable battery and a discharging process of the rechargeable battery, and includes power devices used in both the processes. Thus, the integrated circuit has less semiconductor devices and lowered manufacturer cost. The integrated circuit has a temperature detection function for providing overheat protection of the system so that it operates in a safe temperature range. The integrated circuit also has a battery current-limiting function for limiting an output current of the rechargeable battery and protecting the same. The integrated circuit further has a short-circuit protection function for limiting an output current of the integrated circuit when the output current is too large and protecting the system.

17 Claims, 7 Drawing Sheets

(51) Int. Cl.
H02M 3/156 (2006.01)
H02M 3/158 (2006.01)

(52) U.S. Cl.
CPC ...... *H02J 2007/0059* (2013.01); *H02M 3/156* (2013.01); *H02M 3/1582* (2013.01)

(58) Field of Classification Search
CPC ............. H02J 2007/0059; H02J 7/0042; H02J 7/0044; H02J 7/0045; H02M 3/156; H02M 3/1582
USPC ......................................................... 320/114
See application file for complete search history.

(56) References Cited

U.S. PATENT DOCUMENTS

| | | | | |
|---|---|---|---|---|
| 2013/0220315 A1* | 8/2013 | Conley | .................. | A24F 47/008 |
| | | | | 128/202.21 |
| 2014/0290677 A1* | 10/2014 | Liu | ........................ | A24F 47/008 |
| | | | | 131/329 |
| 2015/0001933 A1* | 1/2015 | Uan-Zo-Li | ............ | H02M 3/158 |
| | | | | 307/31 |
| 2015/0002097 A1* | 1/2015 | Kung | .................... | H02J 7/0072 |
| | | | | 320/128 |
| 2016/0278433 A1* | 9/2016 | Xiang | .................. | H02J 7/0042 |

* cited by examiner

ELECTRONIC CIGARETTE WITH MINIATURIZED CHARGING AND DISCHARGING INTEGRATED CIRCUIT THEREFOR

CLAIM OF PRIORITY

This application claims priority to Chinese Application No. 201410252012.3, filed on Jun. 9, 2014, which is hereby incorporated by reference.

BACKGROUND OF THE INVENTION

Field of the Invention

The present disclosure relates to the field of power electronics, and more particularly, to an electronic cigarette and an integrated circuit for the same.

Description of the Related Art

An electronic cigarette is an electronic product which is popular in today's market for replacing a real cigarette. The electronic cigarette typically includes electronic components such as an integrated circuit, a lithium battery, a gas sensor, an atomizer, and the like. The integrated circuit includes power switches and control circuits. The lithium battery needs to be charged, for example, in a charging process controlled by the integrated circuit to supply electric energy from an external adapter to the lithium battery, and store sufficient electric energy before it is used. When the electronic cigarette is used, the lithium battery needs to be discharged, for example, in a discharging process controlled by the integrated circuit to supply electric energy from the lithium battery to the atomizer, so as to simulate smoking by an atomizing process.

FIG. 1 is a schematic diagram of an integrated circuit used in a conventional electronic cigarette. The integrated circuit includes a power switch Q1, a power switch Q2, a charging circuit 101, a boost circuit 102, a driving control unit 103, a capacitor C1, a capacitor C2, and an inductor L1. The charging circuit 101 includes a power switch Q3, a CC_CV (abbreviation of constant current and constant voltage) control circuit 1011. The boost circuit 102 includes a power switch Q4, a power switch Q5, and a PWM control circuit 1021. A connector is used for being electrically coupling to an adapter or an atomizer. When the connectors is electrically coupled to the adapter, the driving control unit 103 detects a voltage of the adapter, turns on the power switch Q2, and the charging circuit 101 operates to charge the lithium battery through the power switch Q3 and the power switch Q2 from the adapter. When the connector is electrically coupled to the atomizer, the boost circuit 102 boosts a battery voltage to a voltage $V_{BOOST}$, and then the driving control unit 103 controls on and off states of the power switch Q1 to output the voltage $V_{BOOST}$ to the atomizer. The driving control unit 103 detects an average value of the output voltage by a low-pass filter consisting of a resistor R1 and a capacitor C3, compares the average value with an internal voltage reference, and adjusts an on time of the power switch Q1 so that the average value of the output voltage is equal to the internal voltage reference. An output power is thus controlled to be constant.

As shown in the above circuit, the conventional control scheme uses 5 power switches, which results in increased manufacture cost and a complex control process, and will have disadvantages in view of circuit simplification and cost reduction. Moreover, the conventional scheme does not adjust or limit an operating temperature or a current value of the system, and may cause damage of the system when the operating temperature or the current value is too large.

BRIEF DESCRIPTION OF THE INVENTION

In view of this, the present disclosure provides an electronic cigarette and an integrated circuit for the same, which use power devices both in a charging process and in a discharging process, by optimizing the design of the charge and discharge circuit so that the integrated circuit has less semiconductor devices and lowered manufacturer cost.

According to one aspect of the present disclosure, there is provided an integrated circuit for an electronic cigarette, comprising a first connector for a rechargeable battery, a second connector for an external unit, and a third connector for a first capacitor, wherein the integrated circuit comprises a first voltage regulator and a second voltage regulator, the first voltage regulator is electrically coupled between the first connector and the third connector, and the second voltage regulator is electrically coupled between the second connector and the third connector;

when the second connector is electrically coupled to an adapter, the first voltage regulator and the second voltage regulator convert electric energy from the adapter and supply the electric energy to the rechargeable battery;

when the second connector is electrically coupled to an atomizer, the first voltage regulator and the second voltage regulator convert electric energy in the rechargeable battery for the atomizer;

wherein the first voltage regulator operates in a bi-directional mode or a parallel mode, and the second voltage regulator operates in a linear mode or a switching mode.

Preferably, when the first voltage regulator operates in a bi-directional mode, it regulates voltage in a bi-directional and linear mode or in a bi-directional and switching mode; and when the first voltage regulator operates in a parallel mode, it regulates a voltage in a linear mode and in a switching mode in parallel, or in a linear mode and in a linear mode in parallel, or in a switching mode and in a switching mode in parallel;

when the second voltage regulator operates in a linear mode, it regulates voltage in a unidirectional mode or in a bi-directional mode;

when the second voltage regulator operates in a switching mode, it regulates voltage in a unidirectional and switching mode or in a bi-directional and switching mode.

Preferably, when the first voltage regulator operates in a bi-directional and switching mode, the first voltage regulator comprises a first power switch, a second power switch and a charge and discharge control circuit;

when the second voltage regulator operates in a unidirectional and linear mode, the second voltage regulator comprises a third power switch and an output voltage control circuit;

wherein the first power switch has a first power terminal being electrically coupled to the first connector and a second power terminal being grounded; and the second power switch and the third power switch are connected in series between the first connector and the second connector;

when the second connector is electrically coupled to the adapter, the charge and discharge control circuit receives an input detection signal, and generates an input control signal for the output voltage control circuit, the charge and discharge control circuit controls on and off states of the first power switch and the second power switch in response to the input detection signal, and the output voltage control circuit controls on and off states of the third power switch in response to the input control signal, so that electronic energy from the adapter is converted and supplied to the rechargeable battery; and when the second connector is electrically coupled to the atomizer, the charge and discharge control circuit receives a discharge trigger signal, the output voltage control circuit receives an output reference signal, the charge and discharge control circuit controls on and off states of the first power switch and the second power switch in response to the discharge trigger signal, the output voltage control circuit controls on and off states of the third power switch in response to the output reference signal and an output voltage feedback signal, so that electric energy from the rechargeable battery is converted and supplied to the atomizer.

Preferably, the integrated circuit further comprises an input detection circuit and a discharge enable and output power programming circuit, wherein the input detection circuit detects electrical coupling between the second connector and the adapter, and generates the input detection signal for the charge and discharge control circuit, when the second connector is electrically coupled to the adapter; and the discharge enable and output power programming circuit receives a discharge enable and output power programming signal, and generates the discharge trigger signal for the charge and discharge control circuit and the output reference signal for the output voltage control circuit, when the second connector is electrically coupled to the atomizer.

Preferably, the integrated circuit further comprises a battery level detection circuit which detects a battery level of the rechargeable battery in the charging process of the rechargeable battery and generates a battery level detection signal for the charge and discharge control circuit.

Preferably, the third power switch is a unidirectional transistor.

Preferably, the third power switch is a bi-directional transistor.

Preferably, when the electric energy from the adapter is converted and supplied to the rechargeable battery, the third power switch is turned on, and the charge and discharge control circuit controls on and off states of the first power switch and the second power switch to charge the rechargeable battery in a buck mode.

Preferably, when the electric energy from the adapter is converted and supplied to the rechargeable battery, the third power switch is turned on, and the charge and discharge control circuit controls on and off states of the first power switch and the second power switch to charge the rechargeable battery in a buck mode;

or the first power switch is turned off, the second power switch is turned on, and the output voltage control circuit controls on and off states of the third power switch to charge the rechargeable battery in a linear mode.

Preferably, the electric energy from the rechargeable battery is converted and supplied to the atomizer by the processes that the charge and discharge control circuit controls on and off states of the first power switch and the second power switch to convert a battery voltage of the rechargeable battery into an intermediate voltage in a boost mode; and the output voltage control circuit controls the third power switch to operate in a fixed frequency to convert the intermediate voltage into an output voltage and supply the output voltage to the atomizer.

Preferably, the electric energy from the rechargeable battery is converted and supplied to the atomizer by the processes that the charge and discharge control circuit controls on and off states of the first power switch and the second power switch to convert a battery voltage of the rechargeable battery into an intermediate voltage in a boost mode, and controls on and off states of the first power switch and the second power switch to output the intermediate voltage periodically; and when the intermediate voltage is output, the output voltage control circuit turns on the third power switch so as to supply the intermediate voltage to the atomizer, and when the intermediate voltage is not output, the output voltage control circuit turns off the third power switch so that an output voltage of the integrated circuit is discharged through a resistor to a zero voltage.

Preferably, the integrated circuit further comprises a temperature detection circuit which detects a current value of the temperature of the integrated circuit, and generates a temperature detection signal for the charge and discharge control circuit, in a case that the temperature detection circuit detects that the current value of the temperature is larger than a temperature threshold when the electric energy from the adapter is converted and supplied to the rechargeable battery, the charge and discharge control circuit decreases a charging current in the charging process;

in a case that the temperature detection circuit detects that the current value of the temperature is larger than a temperature threshold when the electric energy from the rechargeable battery is converted and supplied to the atomizer, the charge and discharge control circuit decreases a discharging current in the discharging process;

Preferably, the integrated circuit further comprises a first current detection circuit for detecting an output current of the rechargeable battery, and generates a first current detection signal for the charge and discharge control circuit, and in a case that the output current is larger than a first current threshold when the electric energy from the rechargeable battery is converted and supplied to the atomizer, the charge and discharge control circuit decreases the output current of the rechargeable battery.

Preferably, the integrated circuit further comprises a second current detection circuit for detecting an output current of the integrated circuit, and generates a second current detection signal for the charge and discharge control circuit, and in a case that the output current of the integrated circuit is larger than a second current threshold when the electric energy from the rechargeable battery is converted and supplied to the atomizer, the charge and discharge control circuit decreases the output current of the integrated circuit.

Preferably, the integrated circuit further comprises a filter circuit consisting of a first resistor and a second capacitor, wherein the filter circuit receives an output voltage of the integrated circuit, and generates the output voltage feedback signal for the output voltage control circuit.

According to another aspect of the present disclosure, there is provided an electronic cigarette, comprising a peripheral circuit and the above-mentioned integrated circuit, wherein the peripheral circuit comprises a rechargeable battery, a first inductor and a first capacitor, a first terminal of the first inductor is electrically coupled to one end of the rechargeable battery, a second terminal of the first inductor is electrically coupled to the first connector of the integrated circuit, the other end of the rechargeable battery is grounded, a first terminal of the first capacitor is electrically coupled to the third connector of the integrated circuit, a second terminal of the first capacitor is grounded, and the second connector is electrically coupled to the atomizer or the external adapter.

By using the above integrated circuit for the electronic cigarette, the following beneficial effects are achieved, 1. the integrated circuit incorporates a bi-directional control scheme for a charging process of a rechargeable battery and a discharging process of the rechargeable battery, and includes power devices used in both the processes, and thus has less semiconductor devices and lowered manufacturer cost;

2. the integrated circuit has a temperature detection function, and decreases a charging current in the charging process or a discharging current in the discharging process when overheat occurs in the system, for reducing power consumption so that the system operates in a safe temperature range;

3. the integrated circuit also has a battery current-limiting function for limiting an output current of the rechargeable battery and protecting the same when the output current is larger than the first current threshold; and 4. the integrated circuit further has a short-circuit protection function for limiting an output current of the integrated circuit and protecting the system when the output is short circuited and the output current of the integrated circuit is larger than the second current threshold.

DETAILED DESCRIPTION OF EMBODIMENTS OF THE INVENTION

Reference will now be made in detail to particular embodiments of the disclosure, examples of which are illustrated in the accompanying drawings. While the disclosure will be described in conjunction with the preferred embodiments, it will be understood that they are not intended to limit the disclosure to these embodiments. On the contrary, the disclosure is intended to cover alternatives, modifications and equivalents that may be included within the spirit and scope of the disclosure as defined by the appended claims. Furthermore, in the following detailed description of the present disclosure, numerous specific details are set forth in order to provide a thorough understanding of the present disclosure. However, it will be readily apparent to one skilled in the art that the present disclosure may be practiced without these specific details.

Figure 1:
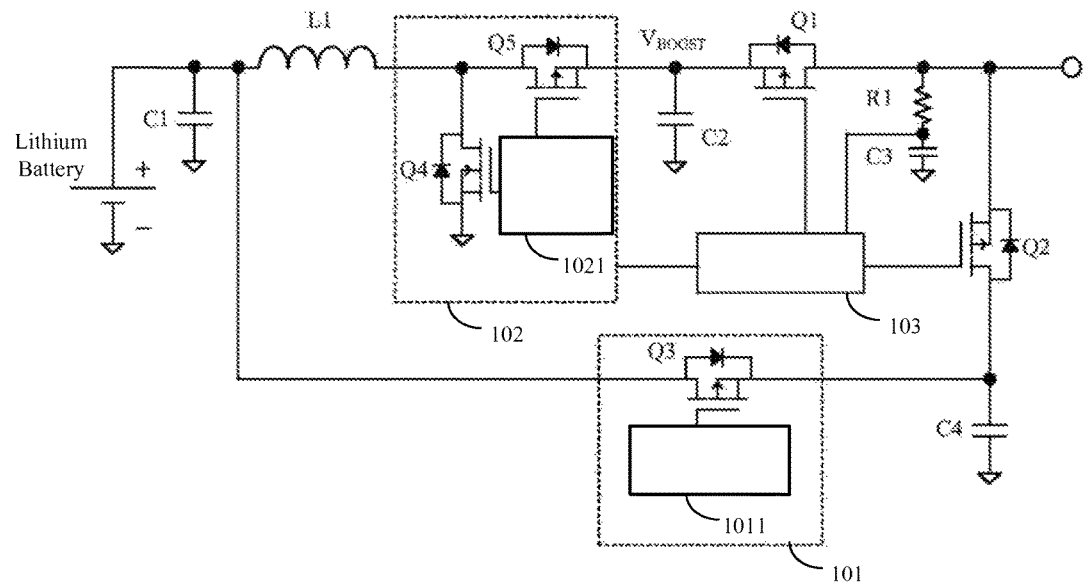
FIG. 1 is a schematic diagram of an integrated circuit used in a conventional electronic cigarette.
Figure 2:
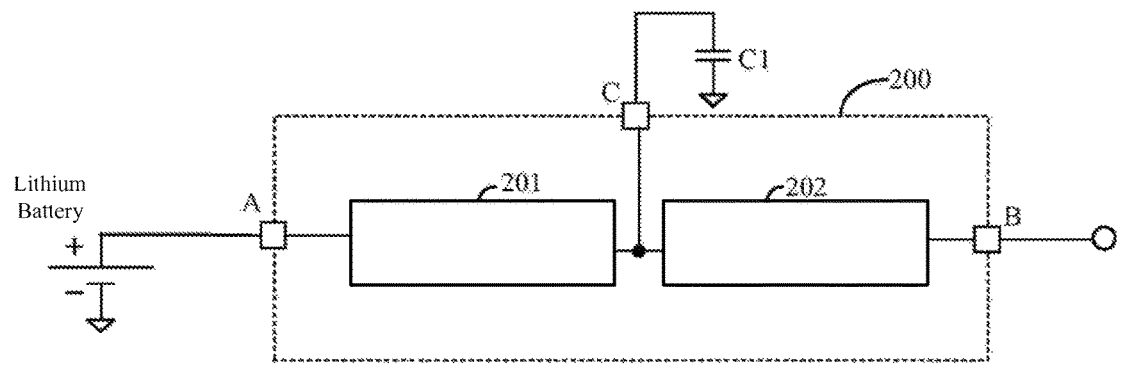
FIG. 2 is a circuit diagram of an integrated circuit used in an electronic cigarette according to a first embodiment of the present disclosure.

Referring now to FIG. 2, there is shown a circuit diagram of an integrated circuit used in an electronic cigarette according to a first embodiment of the present disclosure. The integrated circuit 200 includes a first connector A which is electrically coupled to a rechargeable battery, a second connector B which is electrically coupled to an external unit, and a third connector C which is electrically coupled to a first capacitor. The integrated circuit 200 further includes a first voltage regulator 201 which is electrically coupled between the first connector A and the third connector C, and a second voltage regulator 202 which is electrically coupled between the second connector B and the third connector C.

When the second connector B is electrically coupled to an external adapter, the first voltage regulator 201 and the second voltage regulator 202 convert electric energy from the power supply unit and supply the electric energy to the rechargeable battery.

When the second connector B is electrically coupled to an atomizer, the first voltage regulator 201 and the second voltage regulator 202 convert electric energy in the rechargeable battery and supply the electric energy to an electrical unit.

The first voltage regulator 201 operates in a bi-directional mode or a parallel mode, and the second voltage regulator 202 operates in a linear mode or a switching mode.

Specifically, when the first voltage regulator 201 operates in a bi-directional mode, it regulates voltage in a bi-directional and linear mode or in a bi-directional and switching mode. When the first voltage regulator 201 operates in a parallel mode, it regulates a voltage in a linear mode and in a switching mode in parallel, or in a linear mode and in a linear mode in parallel, or in a switching mode and in a switching mode in parallel. Further referring to FIGS. 3A to 3E, there are shown circuit diagrams of a first voltage regulator 201 according to various embodiments of the present disclosure.

Figure 3A:
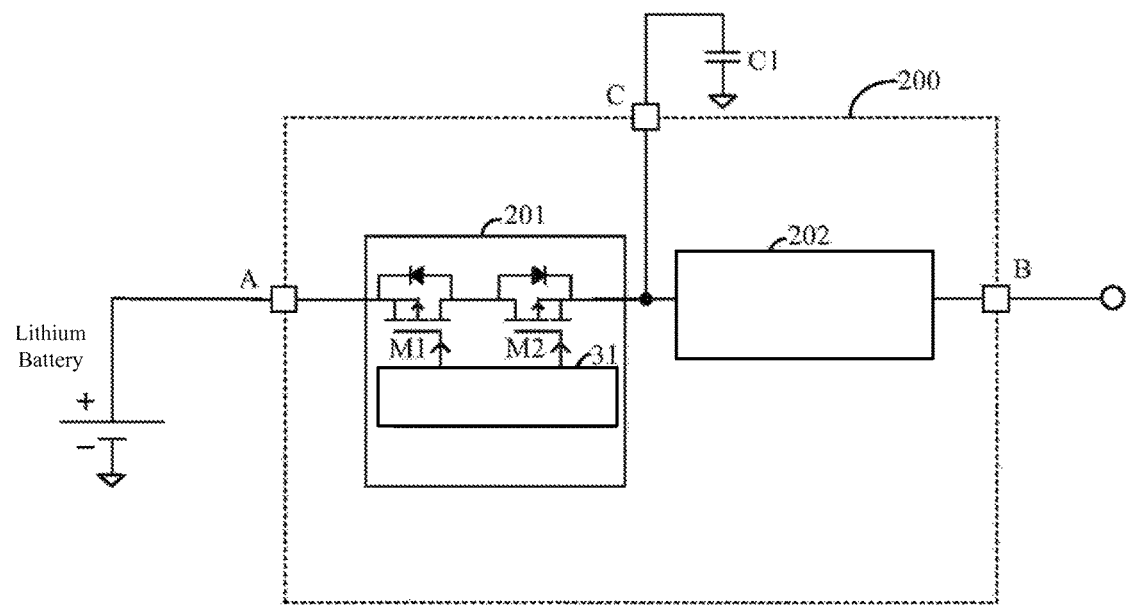
FIGS. 3A to 3E are circuit diagrams of a first voltage regulator according to various embodiments of the present disclosure.

FIG. 3A is a detailed circuit diagram of the first voltage regulator 201 in a bi-directional and linear mode. Two field effect transistors M1 and M2 are connected in series in the bi-directional and linear mode. The driving control circuit 31 controls on and off states of the two transistors M1 and M2 for regulating voltage. N-type transistors are shown in FIG. 3A, as an example, but are not limited thereto. Any suitable transistor may be used, such as a P-type transistor. The following embodiments are described with respect to N-type transistors, but are not limited thereto.

Figure 3B:
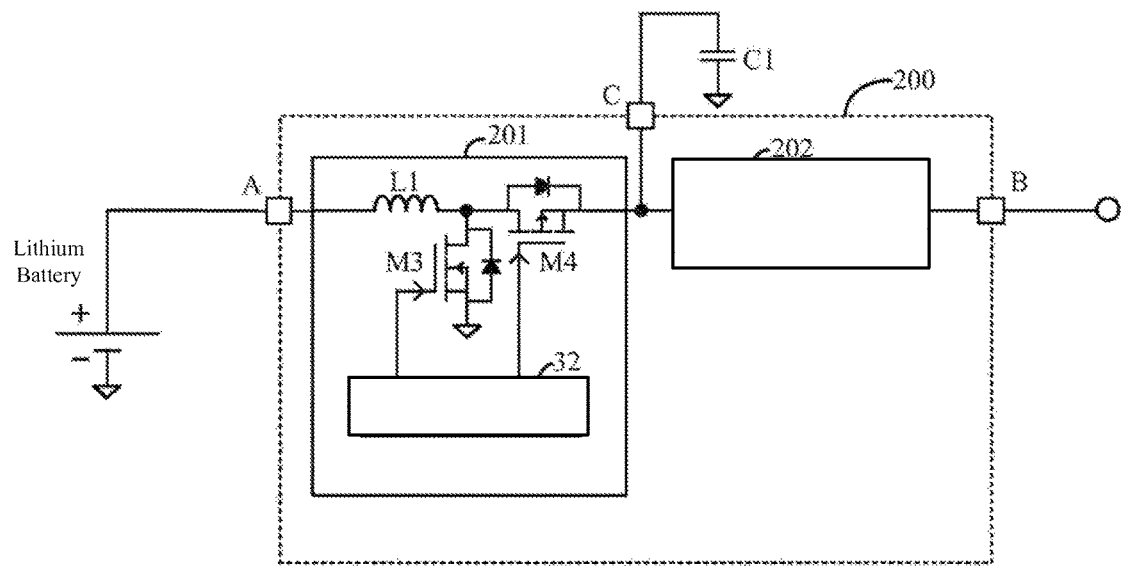

FIG. 3B is a detailed circuit diagram of the first voltage regulator 201 in a bi-directional and switching mode. A switching circuit consisting of an inductor L1, a transistor M3 and a transistor M4 regulates voltage in the bi-directional and switching mode. The driving control circuit 32 controls on and off states of the two transistors M3 and M4 for regulating voltage. The inductor L1 may be included in the integrated circuit or arranged outside the integrated circuit, which is also applicable to the following embodiments.

Figure 3C:
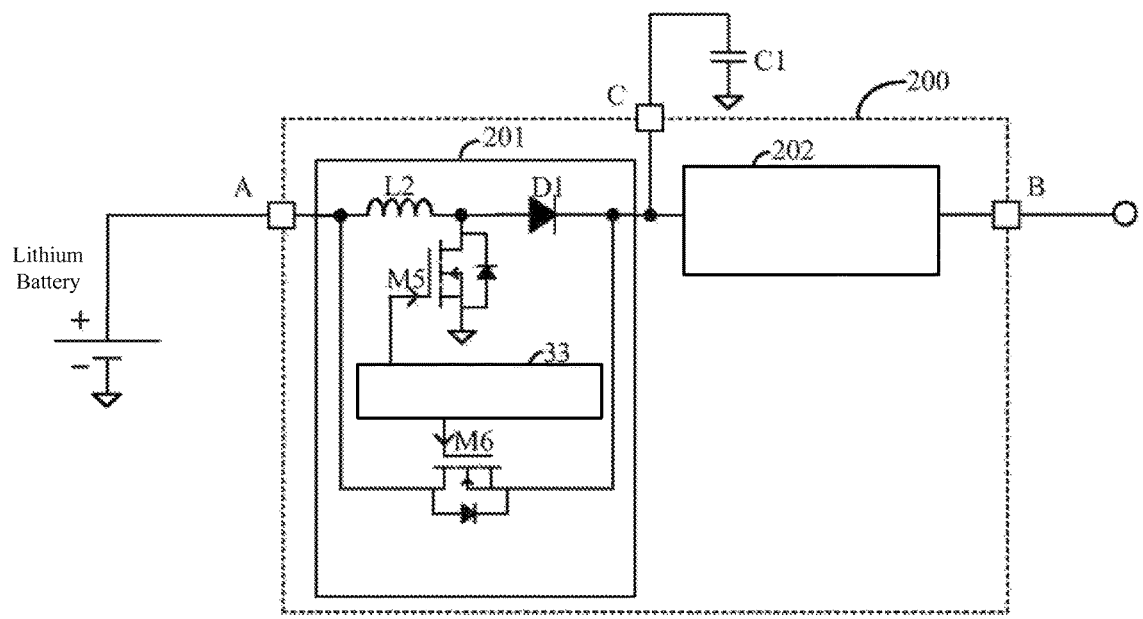

FIG. 3C is a detailed circuit diagram of the first voltage regulator 201 in a parallel mode of a linear mode and a switching mode. A switching circuit consisting of an inductor L2, a transistor M5 and a diode D1, and a linear circuit consisting of a transistor M6, regulates voltage in the parallel mode. The driving control circuit 33 controls on and off states of the two transistors M5 and M6 for regulating voltage.

Figure 3D:
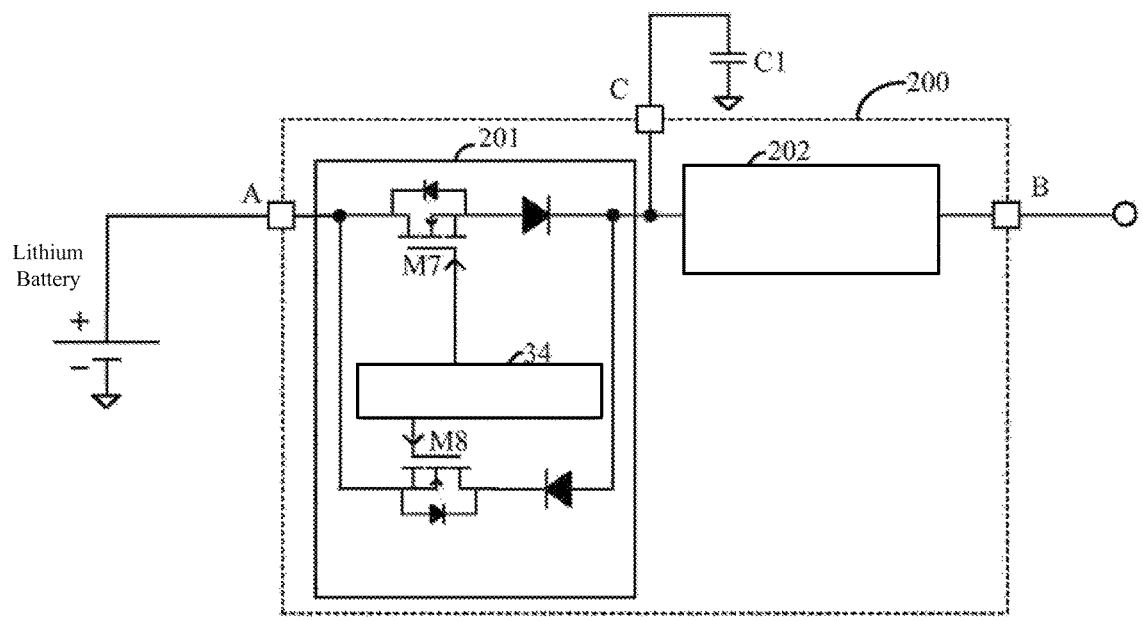

FIG. 3D is a detailed circuit diagram of the first voltage regulator 201 in a parallel mode of a linear mode and a linear mode. A linear circuit consisting of a transistor M7, and a linear circuit consisting of a transistor M8, regulates voltage in the parallel mode. The driving control circuit 34 controls on and off states of the two transistors M7 and M8 for regulating voltage.

Figure 3E:
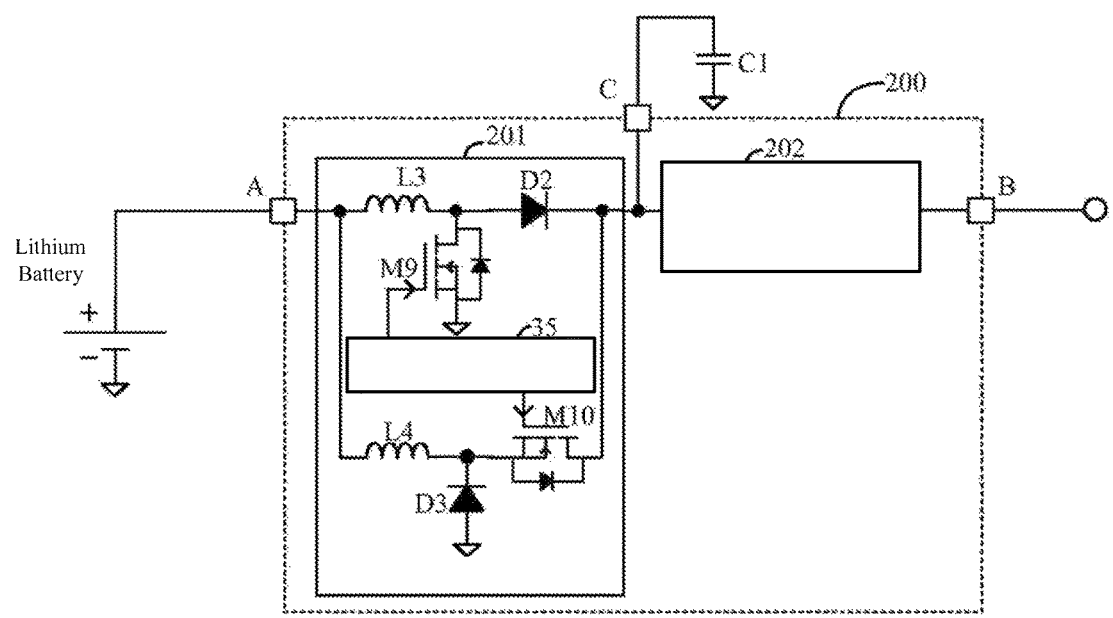

FIG. 3E is a detailed circuit diagram of the first voltage regulator 201 in a parallel mode of a switching mode and a switching mode. A switching circuit consisting of an inductor L3, a transistor M9 and a diode D2, and a switching circuit consisting of an inductor L4, a transistor M10 and a diode D3, regulates voltage in the parallel mode. The driving control circuit 35 controls on and off states of the two transistors M9 and M10 for regulating voltage.

Specifically, when the second voltage regulator 202 operates in a linear mode, it regulates voltage in a unidirectional and linear mode or in a bi-directional and linear mode. When the second voltage regulator operates in a switching mode, it regulates voltage in a unidirectional and switching mode or in a bi-directional and switching mode. Further referring to FIGS. 4A to 4D, there are shown circuit diagrams of a second voltage regulator 202 according to various embodiments of the present disclosure.

Figure 4A:
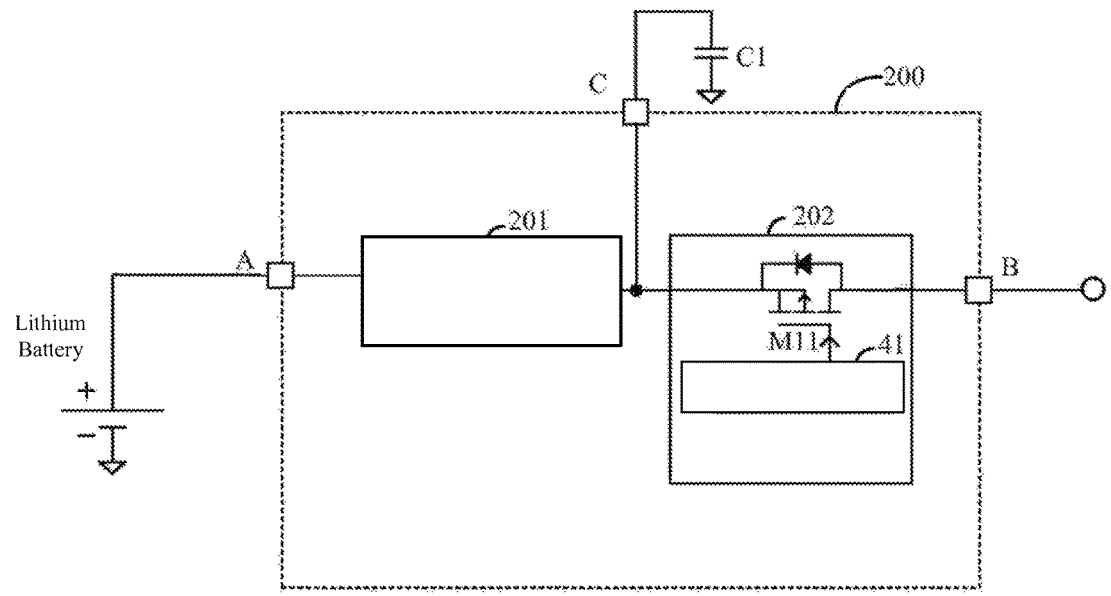
FIGS. 4A to 4D are circuit diagrams of a second voltage regulator according to various embodiments of the present disclosure.

FIG. 4A is a detailed circuit diagram of the second voltage regulator 202 in a unidirectional and linear mode. A transistor M11 regulates voltage in the unidirectional and linear mode. The driving control circuit 41 controls on and off states of the transistor M11 for regulating voltage.

Figure 4B:
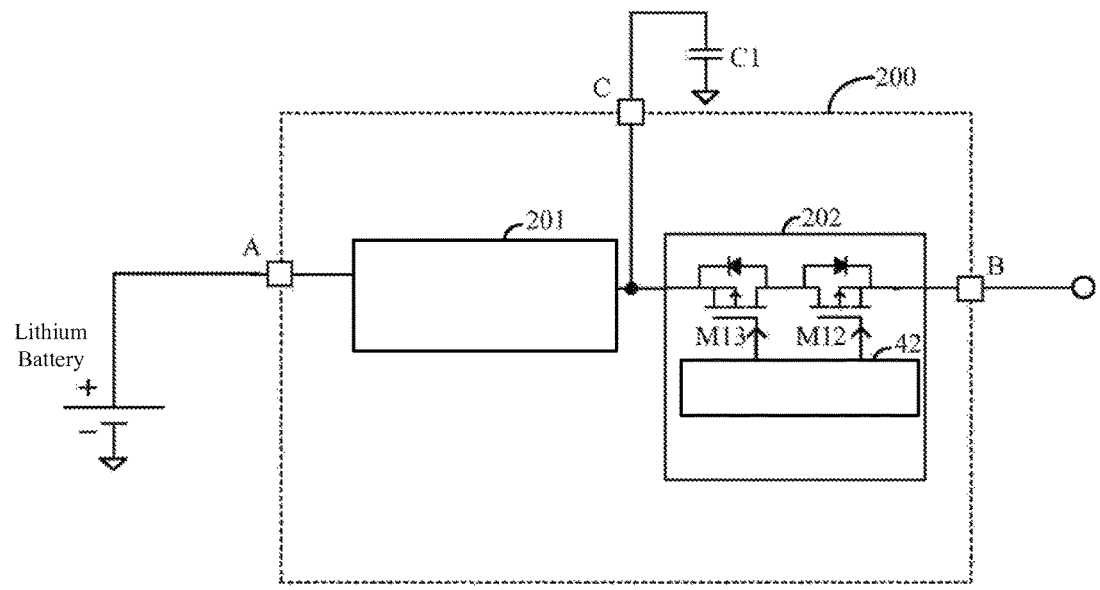

FIG. 4B is a detailed circuit diagram of the second voltage regulator 202 in a bi-directional and linear mode. A transistor M12 and a transistor M13 regulate voltage in the bi-directional and linear mode. The driving control circuit 42 controls on and off states of the transistor M12 and the transistor M13 for regulating voltage.

Figure 4C:
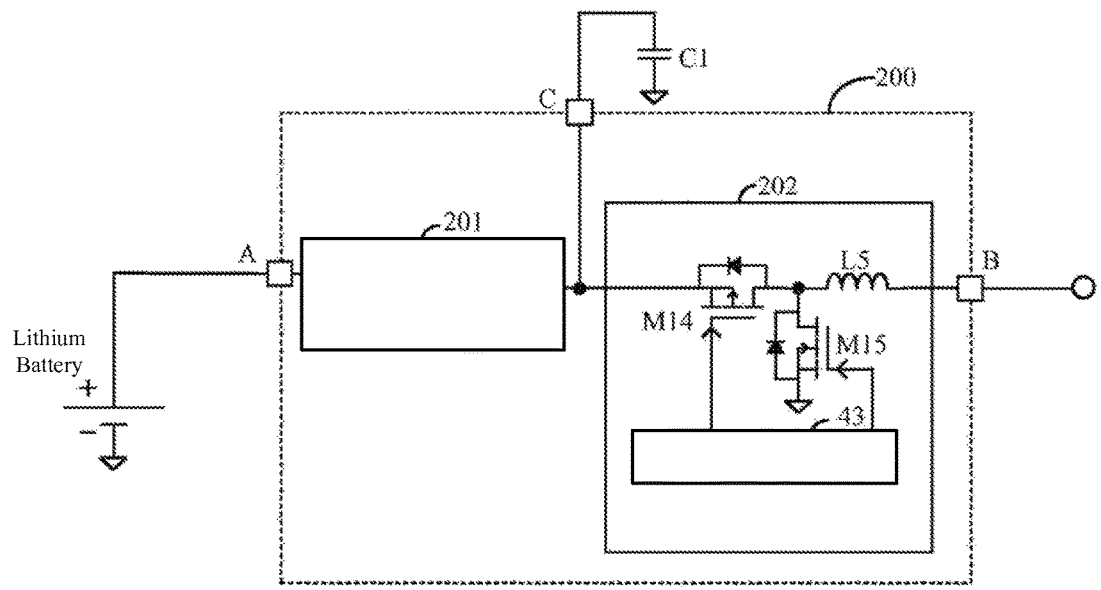

FIG. 4C is a detailed circuit diagram of the second voltage regulator 202 in a bi-directional and switching mode. A switching circuit consisting of a transistor M14, a transistor M15 and an inductor L5 regulates voltage in the bi-directional and switching mode. The driving control circuit 43 controls on and off states of the transistor M14 and the transistor M15 for regulating voltage.

Figure 4D:
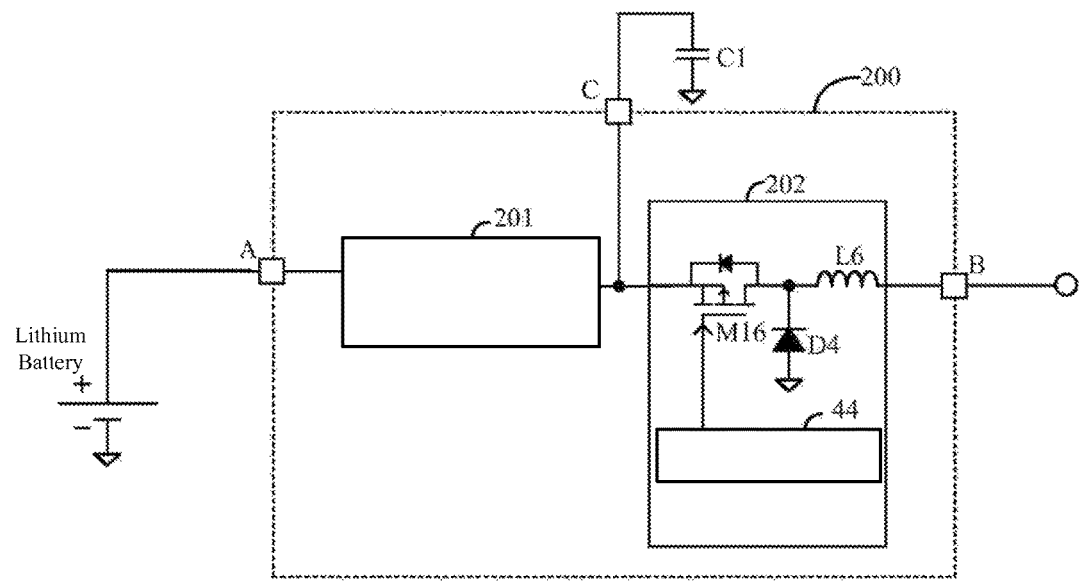

FIG. 4D is a detailed circuit diagram of the second voltage regulator 202 in a unidirectional and switching mode. A transistor M16, a diode D4 and an inductor L6 regulate voltage in the unidirectional and switching mode. The driving control circuit 44 controls on and off states of the transistor M16 for regulating voltage.

The first voltage regulator 201 and the second voltage regulator 202 regulate voltage in different modes in the above embodiments. The different modes of the first voltage regulator 201 and the second voltage regulator 202 may be cooperative, such as that the first voltage regulator 201 may be in a bi-directional and linear mode and the second voltage regulator 202 may be in any of the unidirectional and linear mode, the bi-directional and linear mode, the unidirectional and switching mode, and the bi-directional and switching mode. It will be understood that the above embodiments are only examples of various regulating modes, other circuits having the same functions are also covered by the protection scopes as claimed.

Figure 5:
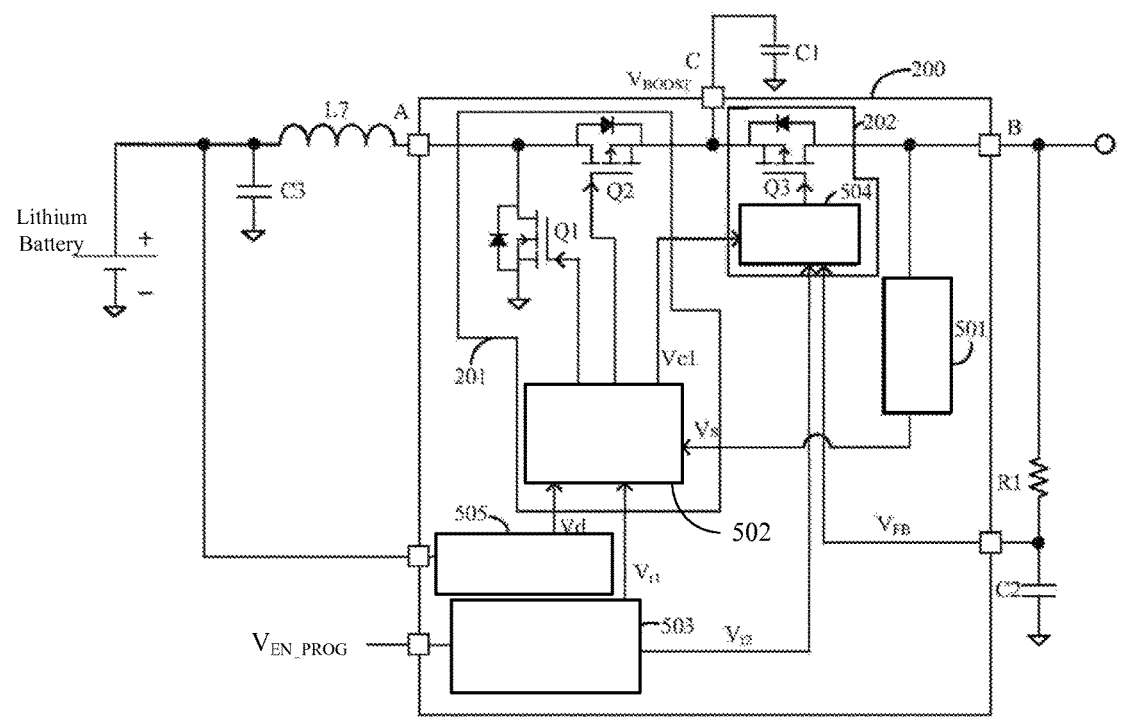
FIG. 5 is a detailed circuit diagram of the integrated circuit used in the electronic cigarette according to the first embodiment of the present disclosure.

FIG. 5 is a detailed circuit diagram of the integrated circuit used in the electronic cigarette according to the first embodiment of the present disclosure. The electronic cigarette comprises a peripheral circuit and an integrated circuit 200. The peripheral circuit comprises a rechargeable battery, preferably a lithium battery as an example here and herein below, a first inductor L7, and a first capacitor C1. A first terminal of the first inductor L7 is electrically coupled to one end of the lithium battery, and a second terminal of the first inductor L7 is electrically coupled to the first connector A of the integrated circuit. The other end of the lithium battery Li is grounded. A first terminal of the first capacitor C1 is electrically coupled to the third connector C of the integrated circuit, and a second terminal of the first capacitor C1 is grounded. The second connector B is electrically coupled to the atomizer or the external adapter. Moreover, the peripheral circuit includes a third capacitor C3. A first terminal of the third capacitor C3 is electrically coupled to the first terminal of the first inductor L7, and a second terminal of the third capacitor C3 is grounded.

Specifically, the integrated circuit 200 includes a first voltage regulator 201 and a second voltage regulator 202. In this embodiment, the first voltage regulator 201 is described as operating in a bi-directional and switching mode as an example, and the second voltage regulator 202 is described as operating in a unidirectional and linear mode.

Furthermore, the first voltage regulator 201 includes a first power switch Q1, a second power switch Q2 and a charge and discharge control circuit 502. The second voltage regulator 202 includes a third power switch Q3 and an output voltage control circuit 504. The second power switch Q2 and the third power switch Q3 are connected in series between the connector and the first terminal of the first inductor L7. The first power terminal of the first power switch Q1 is electrically coupled to the first terminal of the first inductor L7, and the second power terminal of the first power switch Q1 is grounded. Furthermore, the integrated circuit 200 includes an adapter detection circuit 501 and a discharge enable and output power programming circuit 503. Here, the integrated circuit 200 further includes a battery level detection circuit 505 which detects a battery level of the lithium battery in the charging process of the lithium battery, and generates a battery level detection signal Vd for the charge and discharge control circuit 502.

The adapter detection circuit 501 detects whether the connector is electrically coupled to the adapter. When the connector is electrically coupled to the adapter, the adapter detection circuit 501 generates an input detection signal Vs for the charge and discharge control circuit 502. The charge and discharge control circuit 502 receives the input detection signal Vs, determines that the connector has been electrically coupled to the adapter, and then performs a charging process of the lithium battery Li. The charging process of the lithium battery includes: the charge and discharge control circuit 502 generates an input control signal Vc1 for the output voltage control circuit 504, the charge and discharge control circuit 502 controls on and off states of the first power switch Q1 and the second power switch Q2 in response to the input detection signal Vs, and the output voltage control circuit 504 controls on and off states of the third power switch Q3 in response to the input control signal Vc1, so that electric energy is supplied to the lithium battery Li. It will be understood that the third power switch Q3 may be a unidirectional transistor or a bi-directional transistor. FIG. 2 shows a unidirectional transistor as an example. When the lithium battery is charged, the output voltage control circuit 504 turns on the third power switch Q3, and the charge and discharge control circuit 502 controls on and off states of the first power switch Q1 and the second power switch Q2 to charge the lithium battery in a buck mode. Thereafter, when the battery level detection circuit 205 detects that the lithium battery is fully charged, the charge and discharge control circuit 502 stops the charging process.

In a case that the third power switch Q3 is a bi-directional transistor not shown in FIG. 2, either the second power switch Q2 or the third power switch Q3 may be a charging control switch. If the second power switch Q2 is used as a charging control switch, the control process is the same as that described above. If the third power switch Q3 is used as a charging control switch, the charging process may include: the charge and discharge control circuit 502 turns off the first power switch Q1 and turns on the second power Q2, and output voltage control circuit 504 controls on and off states of the third power switch Q3 to charge the lithium battery in a linear mode.

When a user needs to use an electronic cigarette, the atomizer is electrically coupled to the connector, and the integrated circuit 200 starts a discharging process in a given output power after receiving a discharge enable and output power programming signal $V_{EN\_PROG}$ from outside. It should be noted that the discharge enable and output power programming signal $V_{EN\_PROG}$ is used for setting an output power in accordance with user's requirement. The output power may be large if one expects a heavy mist, and the output power may be small if one expects a light mist. The discharging process means a process in which electric energy from the lithium battery is converted and supplied to the atomizer, which has the same meaning in the following paragraphs.

When the system performs a discharging process, the discharge enable and output power programming circuit 503 receives the discharge enable and output power programming signal, and generates a discharge trigger signal Vt1 for the charge and discharge control circuit 502 and an output reference signal Vr1 for the output voltage control circuit 504. The charge and discharge control circuit 502 controls on and off states of the first power switch Q1 and the second power switch Q2 in response to the discharge trigger signal Vt1. The output voltage control circuit 504 controls on and off states of the third power switch Q3 in response to the output reference signal Vr1 and an output voltage feedback signal $V_{FB}$, so that electric energy from the lithium battery is converted and supplied to the atomizer. It should be further noted that the discharge enable and output power programming circuit 503 generates a discharge trigger signal Vt1 for the charge and discharge control circuit 502 and an output reference signal Vr1 for the output voltage control circuit 504 by several processes. When a discharging process is required from outside, the discharge enable and output power programming signal $V_{EN\_PROG}$ provides a high-level signal to the discharge enable and output power programming circuit 503. The discharge enable and output power programming circuit 503 times the duration of the high-level signal, and outputs the discharge trigger signal Vt1 when the duration reaches a predetermined time period, for example by a timing circuit, but not limited thereto. When the output power is required to be adjusted, the discharge enable and output power programming circuit 503 sets a voltage reference corresponding to different values of the output power by providing a pulse train. By providing different pulse trains, the corresponding voltage reference is selected as the output reference signal Vr1. The present embodiment further includes a low-pass filter consisting of a first resistor R1 and a second capacitor C2 for detecting an average of the output voltage, and generates an output voltage feedback signal $V_{FB}$ for the output voltage control circuit 504. The first resistor R1 and the second capacitor C2 may be included in or outside the integrated circuit 200. The latter is not described in the present disclosure.

The discharging process of the lithium battery includes: the charge and discharge control circuit 502 controls on and off states of the first power switch Q1 and the second power switch Q2 to convert a battery voltage of the lithium battery into an intermediate voltage $V_{BOOST}$ in a boost mode, and the output voltage control circuit 504 controls the third power switch Q3 to operate in a fixed frequency so as to convert the intermediate voltage signal $V_{BOOST}$ into an output voltage for the atomizer, so as to maintain an output power to be constant.

In another embodiment, the discharging process of the lithium battery includes: the charge and discharge control circuit 502 controls on and off states of the first power switch Q1 and the second power switch Q2 so as to convert a battery voltage of the lithium battery into an intermediate voltage signal $V_{BOOST}$ in a boost mode, and the charge and discharge control circuit 502 controls on and off states of the first power switch Q1 and the second power switch Q2 so as to output the intermediate voltage signal $V_{BOOST}$ periodically; when the intermediate voltage signal $V_{BOOST}$ is output, the output voltage control circuit 504 turns on the third power switch Q3 so as to provide the intermediate voltage signal $V_{BOOST}$ to the atomizer; and when the intermediate voltage signal $V_{BOOST}$ is not output, the output voltage control circuit 504 turns off the third power switch Q3; an output voltage of the integrated circuit 200 is discharged through a resistor to a zero voltage, which is not shown here and may be replaced by other kinds of discharge circuits. For example, in the present embodiment, the first inductor L7, the first power switch Q1, the second power switch Q2 and the first capacitor C1 constitute a synchronous boost circuit. The third power switch Q3 is turned on after the boost circuit has operated normally for a first time period in the discharging process, and the output voltage of the integrated circuit is $V_{BOOST}$. The third power switch Q3 is turned off after the boost circuit has stopped operation for a second time period, and the output voltage of the integrated circuit is a zero voltage. By optimizing the first time period and the second time period, the output power of the integrated circuit will be equal to a predetermined value, so as to maintain the output power to be constant.

As shown in the above processes, the integrated circuit for the electronic cigarette according to the present disclosure incorporates a bi-directional control scheme for a charging process of a rechargeable battery and a discharging process of the rechargeable battery, and includes power devices used in both the processes for energy transfer, and thus has less semiconductor devices, simplifies a control process, reduces manufacturer cost, and has an improved effect. It should be noted that other voltage regulation modes of the first voltage regulator as shown in FIGS. 3A to 3E and other voltage regulation modes of the second voltage regulator as shown in FIGS. 4A to 4D can all be used in the integrated circuit of the electronic cigarette according to the present embodiment. Only a few of the voltage regulation modes are listed herein.

Figure 6:
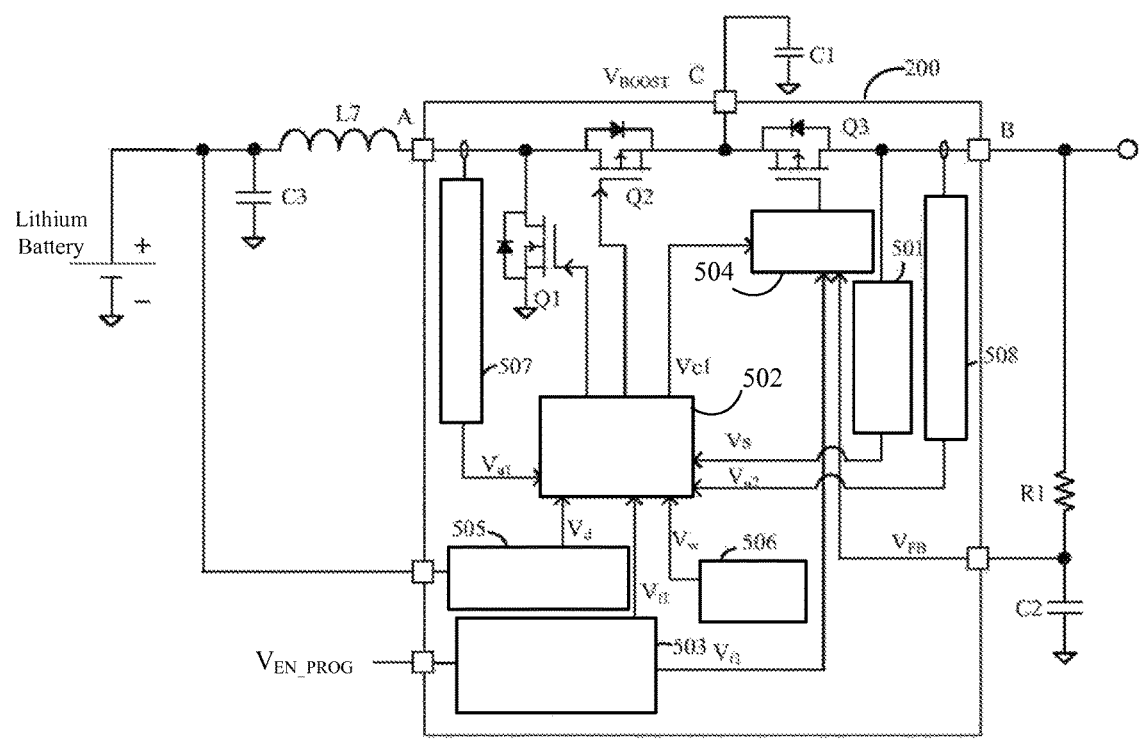
FIG. 6 is a detailed circuit diagram of the integrated circuit used in the electronic cigarette according to a second embodiment of the present disclosure.

Referring to FIG. 6, there is shown a detailed circuit diagram of the integrated circuit used in the electronic cigarette according to the second embodiment of the present disclosure. Comparing with the first embodiment, the integrated circuit for the electronic cigarette according to the second embodiment further includes a temperature detection circuit 506, a first current detection circuit 507 and a second current detection circuit 508. The same circuits in the first and second embodiments have the same functions, and the description thereof is omitted here. The charging and discharging processes of the lithium battery in the first and second embodiments are the same ones, and will be mentioned below briefly.

The temperature detection circuit 506 detects a current value of the temperature of the integrated circuit, and generates a temperature detection signal Vw for the charge and discharge control circuit 502. In a case that the temperature detection circuit detects that the current value of the temperature is larger than a temperature threshold, the charge and discharge control circuit decreases a charging current in the charging process or a discharging current in the discharging process, for reducing power consumption so that the system operates in a safe temperature range.

The first temperature detection circuit 507 detects an output current of the lithium battery, and generates a first current detection signal Vu1 for the charge and discharge control circuit 502. In a case that the output current is larger than a first current threshold when the electric energy from the rechargeable battery is converted and supplied to the atomizer, the charge and discharge control circuit 502 decreases the output current of the lithium battery in the discharging process to protect the battery.

The second temperature detection circuit 508 detects an output current of the integrated circuit, and generates a second current detection signal Vu2 for the charge and discharge control circuit 502. In a case that the output is short circuited and the output current is larger than a second current threshold when the electric energy from the lithium battery is converted and supplied to the atomizer, the charge and discharge control circuit decreases the output current of the integrated circuit in the discharging process to protect the system.

The present disclosure further provides an electronic cigarette, comprising a peripheral circuit and the above-mentioned integrated circuit. The peripheral circuit includes a rechargeable battery, a first inductor and a first capacitor. A first terminal of the first inductor is electrically coupled to one end of the rechargeable battery, and a second terminal of the first inductor is electrically coupled to the first connector of the integrated circuit. The other end of the rechargeable battery is grounded. A first terminal of the first capacitor is electrically coupled to the third connector of the integrated circuit, and a second terminal of the first capacitor is grounded. The second connector is electrically coupled to the atomizer or the external adapter. Similarly, the integrated circuit for the electronic cigarette here has less semiconductor devices, simplifies a control process, has the functions of overheat protection, battery current limiting protection, and output short circuit protection, and the like, and thus has an improved effect.

To sum up, the electronic cigarette and the integrated circuit therefor according to various embodiments of the present disclosure incorporate a bi-directional control scheme for a charging process of a rechargeable battery and a discharging process of the rechargeable battery, and includes power devices used in both the processes. The integrated circuit has less semiconductor devices and reduces manufacturer cost. Moreover, the integrated circuit has the complete functions of overheat protection, battery current limiting protection, and output short circuit protection, and the like. The electronic cigarette can be used more safely and more reliably.

The electronic cigarette and the integrated circuit therefor according to the present disclosure have been described in detail for the preferable embodiments. It is apparent for one skilled person that other technique or configuration or circuits or electronic devices, if being equivalents, can also be used in these embodiments.

Although various embodiments of the present invention are described above, these embodiments neither present all details, nor imply that the present invention is limited to these embodiments. Obviously, many modifications and changes may be made in light of the teaching of the above embodiments. These embodiments are presented and some details are described herein only for explaining the principle of the invention and its actual use, so that one skilled person can practice the present invention and introduce some modifications in light of the invention. The invention is intended to cover alternatives, modifications and equivalents that may be included within the spirit and scope of the invention as defined by the appended claims.

What is claimed is:

1. An integrated circuit for an electronic cigarette, comprising: a first connector for being electrically coupled to a rechargeable battery, a second connector for being electrically coupled to an external unit, and a third connector for being electrically coupled to a first capacitor, wherein said integrated circuit comprises a first voltage regulator and a second voltage regulator, said first voltage regulator is electrically coupled between said first connector and said third connector, and said second voltage regulator is electrically coupled between said second connector and said third connector;

when said second connector is electrically coupled to an adapter, electric energy from said adapter is converted and supplied to said rechargeable battery through said second voltage regulator and said first voltage regulator successively; and when said second connector is electrically coupled to an atomizer, electric energy from said rechargeable battery is converted and supplied to said atomizer through said first voltage regulator and said second voltage regulator successively;

wherein said first voltage regulator operates in a bi-directional mode or a parallel mode, and said second voltage regulator operates in a linear mode or a switching mode.

2. The integrated circuit according to claim 1, wherein
when said first voltage regulator operates in a bi-directional mode, it regulates voltage in said bi-directional and linear mode or in a bi-directional and switching mode; and when said first voltage regulator operates in a parallel mode, it regulates voltage in said linear mode and in a switching mode in parallel, or in a linear mode and in a linear mode in parallel, or in a switching mode and in a switching mode in parallel;

when said second voltage regulator operates in said linear mode, it regulates voltage in a unidirectional and linear mode or in a bi-directional and linear mode; and when said second voltage regulator operates in said switching mode, it regulates voltage in a unidirectional and switching mode or in a bi-directional and switching mode.

3. The integrated circuit according to claim 2, wherein when said first voltage regulator operates in a bi-directional and switching mode, said first voltage regulator comprises a first power switch, a second power switch and a charge and discharge control circuit;

when said second voltage regulator operates in a unidirectional and linear mode, said second voltage regulator comprises a third power switch and an output voltage control circuit;

wherein said first power switch has a first power terminal being electrically coupled to said first connector and a second power terminal being grounded; and said second power switch and said third power switch are connected in series between said first connector and said second connector;

when said second connector is electrically coupled to said adapter, said charge and discharge control circuit receives an input detection signal, and generates an input control signal for said output voltage control circuit, said charge and discharge control circuit controls on and off states of said first power switch and said second power switch in response to said input detection signal, and said output voltage control circuit controls on and off states of said third power switch in response to said input control signal; and when said second connector is electrically coupled to said atomizer, said charge and discharge control circuit receives a discharge trigger signal, said output voltage control circuit receives an output reference signal, said charge and discharge control circuit controls on and off states of said first power switch and said second power switch in response to said discharge trigger signal, said output voltage control circuit controls on and off states of said third power switch in response to said output reference signal and an output voltage feedback signal.

4. The integrated circuit according to claim 3, further comprising an input detection circuit and a discharge enable and output power programming circuit, said input detection circuit detects electrical coupling between said second connector and said adapter, and generates said input detection signal for said charge and discharge control circuit, when said second connector is electrically coupled to said adapter; and said discharge enable and output power programming circuit receives a discharge enable and output power programming signal, and generates said discharge trigger signal for said charge and discharge control circuit and said output reference signal for said output voltage control circuit, when said second connector is electrically coupled to said atomizer.

5. The integrated circuit according to claim 4, further comprising a battery level detection circuit which detects a battery level of said rechargeable battery in said charging process of said rechargeable battery and generates a battery level detection signal for said charge and discharge control circuit.

6. The integrated circuit according to claim 5, further comprising a temperature detection circuit which detects a current value of said temperature of said integrated circuit, and generates a temperature detection signal for said charge and discharge control circuit, in a case that said temperature detection circuit detects that said current value of said temperature is larger than a temperature threshold when said electric energy from said adapter is converted and supplied to said rechargeable battery, said charge and discharge control circuit decreases a charging current in said charging process; and in a case that said temperature detection circuit detects that said current value of said temperature is larger than a temperature threshold when said electric energy from said rechargeable battery is converted and supplied to said atomizer, said charge and discharge control circuit decreases a discharging current in said discharging process.

7. The integrated circuit according to claim 5, further comprising a first current detection circuit for detecting an output current of said rechargeable battery, and generates a first current detection signal for said charge and discharge control circuit, and in a case that said output current is larger than a first current threshold when said electric energy from said rechargeable battery is converted and supplied to said atomizer, said charge and discharge control circuit decreases said output current of said rechargeable battery.

8. The integrated circuit according to claim 5, further comprising a second current detection circuit for detecting an output current of said integrated circuit, and generates a second current detection signal for said charge and discharge control circuit, and in a case that said output current of said integrated circuit is larger than a second current threshold when said electric energy from said rechargeable battery is converted and supplied to said atomizer, said charge and discharge control circuit decreases said output current of said integrated circuit.

9. The integrated circuit according to claim 5, further comprising a filter circuit consisting of a first resistor and a second capacitor, wherein said filter circuit receives an output voltage of said integrated circuit, and generates said output voltage feedback signal for said output voltage control circuit.

10. The integrated circuit according to claim 3, wherein said third power switch is a unidirectional transistor.

11. The integrated circuit according to claim 10, wherein when said electric energy from said adapter is converted and supplied to said rechargeable battery, said third power switch is turned on, and said charge and discharge control circuit controls on and off states of said first power switch and said second power switch to charge said rechargeable battery in a buck mode.

12. The integrated circuit according to claim 3, wherein said third power switch is a bi-directional transistor.

13. The integrated circuit according to claim 12, wherein when said electric energy from said adapter is converted and supplied to said rechargeable battery, said third power switch is turned on, and said charge and discharge control circuit controls on and off states of said first power switch and said second power switch to charge said rechargeable battery in a buck mode;

or said first power switch is turned off, said second power switch is turned on, and said output voltage control circuit controls on and off states of said third power switch to charge said rechargeable battery in a linear mode.

14. The integrated circuit according to claim 3, wherein said electric energy from said rechargeable battery is converted and supplied to said atomizer by the processes that said charge and discharge control circuit controls on and off states of said first power switch and said second power switch to convert a battery voltage of said rechargeable battery into an intermediate voltage in a boost mode; and said output voltage control circuit controls said third power switch to operate in a fixed frequency to convert said intermediate voltage into an output voltage and supply said output voltage to said atomizer.

15. The integrated circuit according to claim 3, wherein said electric energy from said rechargeable battery is converted and supplied to said atomizer by the processes that said charge and discharge control circuit controls on and off states of said first power switch and said second power switch to convert a battery voltage of said rechargeable battery into an intermediate voltage in a boost mode, and controls on and off states of said first power switch and said second power switch to output said intermediate voltage periodically; and when said intermediate voltage is output, said output voltage control circuit turns on said third power switch so as to supply said intermediate voltage to said atomizer, and when said intermediate voltage is not output, said output voltage control circuit turns off said third power switch so that an output voltage of said integrated circuit is discharged through a resistor to a zero voltage.

16. The integrated circuit according to claim 1, wherein when said second connector is electrically coupled to an atomizer, said first voltage regulator operates in a boost mode and provides an intermediate voltage at said first capacitor by converting a battery voltage.

17. An electronic cigarette, comprising: a peripheral circuit and an integrated circuit,
wherein said integrated circuit comprises a first connector for being electrically coupled to a rechargeable battery, a second connector for being electrically coupled to an external unit, a third connector for being electrically coupled to a first capacitor, a first voltage regulator and a second voltage regulator,
said first voltage regulator is electrically coupled between said first connector and said third connector, and said second voltage regulator is electrically coupled between said second connector and said third connector;
when said second connector is electrically coupled to an adapter, electric energy from said adapter is converted and supplied to said rechargeable battery through said second voltage regulator and said first voltage regulator successively; and
when said second connector is electrically coupled to an atomizer, electric energy from said rechargeable battery is converted and supplied to said atomizer through said first voltage regulator and said second voltage regulator successively;
wherein said first voltage regulator operates in a bi-directional mode or a parallel mode, and said second voltage regulator operates in a linear mode or a switching mode,
wherein said peripheral circuit comprises said rechargeable battery, a first inductor and a first capacitor, a first terminal of said first inductor is electrically coupled to one end of said rechargeable battery, a second terminal of said first inductor is electrically coupled to said first connector of said integrated circuit, the other end of said rechargeable battery is grounded, a first terminal of said first capacitor is electrically coupled to said third connector of said integrated circuit, a second terminal of said first capacitor is grounded, and said second connector is electrically coupled to said atomizer or said external adapter.

* * * * *